United States Patent [19]

Jönsson

[11] Patent Number: 4,818,345

[45] Date of Patent: Apr. 4, 1989

[54] DISTILLATION APPARATUS

[76] Inventor: Ann-Sofi Jönsson, Sandvägen 35, S-240 13 Genarp, Sweden

[21] Appl. No.: 30,862

[22] PCT Filed: Jun. 16, 1986

[86] PCT No.: PCT/SE86/00289

§ 371 Date: Feb. 10, 1987

§ 102(e) Date: Feb. 10, 1987

[87] PCT Pub. No.: WO86/07585

PCT Pub. Date: Dec. 31, 1986

[30] Foreign Application Priority Data

Jun. 17, 1985 [SE] Sweden .................... 8502999

[51] Int. Cl.$^4$ .............. B01D 13/00; B01D 53/22; C02F 1/04
[52] U.S. Cl. .................. 202/163; 202/267.1; 159/DIG. 27; 203/10; 203/86; 203/99; 203/DIG. 17; 210/640
[58] Field of Search .............. 202/163, 82, 152, 172, 202/173, 236, 267, 185.1; 203/10, 11, 89, 72, 4, 99, 86, DIG. 17; 159/DIG. 27, DIG. 28; 210/321.5, 640; 55/11, 158

[56] References Cited

U.S. PATENT DOCUMENTS

| | | | |
|---|---|---|---|
| 3,266,223 | 8/1966 | Dresser et al. | 159/DIG. 27 |
| 3,563,860 | 2/1971 | Henderyckx | 159/DIG. 27 |
| 3,878,054 | 4/1975 | Rodgers | 159/DIG. 27 |
| 4,391,676 | 7/1983 | Torberger | 159/DIG. 27 |
| 4,545,862 | 10/1985 | Gore et al. | 202/202 |
| 4,620,900 | 11/1986 | Kimura et al. | 159/DIG. 27 |

Primary Examiner—Wilbur Bascomb
Attorney, Agent, or Firm—Darby & Darby

[57] ABSTRACT

A distillation apparatus intended for distilling liquid, primarily water, comprising a distillation unit which includes a porous, hydrophobic membrane (2) which is pervious to steam, or vapor, but impervious to liquid, and a condensation surface (3) located at a distance from the membrane, such as to present an air gap (4) between the membrane and the condensation surface, the distillation apparatus further comprising units for conducting the liquid (20) to be distilled on the membrane surface remote from the air gap (4), and a unit for conducting a liquid (22) which is colder than the first mentioned liquid (20) on the side of the condensation surface (3) remote from the air gap (4). According to the invention the distance (L) between the membrane (2) and the condensation (3) lies in the range of about 0.2 mm–about 1 mm, and the thickness (b) of the membrane (2) is less than about 0.5 mm.

10 Claims, 3 Drawing Sheets

DISTILLATION APPARATUS

The present invention relates to a distillation apparatus primarily intended for desalinating or de-salting sea water. The distillation apparatus according to the invention is more specifically a membrane distillation apparatus.

In Swedish Patent Specification No. 419 699 there is described an apparatus for membrane distillation which comprises a plurality of first cassettes intended for conducting warm salt water, and a plurality of second cassettes intended for conducting a cold liquid, such as cold salt water. A separation cassette effective for separating one of the first cassettes from one of the second cassettes is provided between two mutually adjacent cassettes.

The separation cassette of the aforementioned Patent Specification includes a hydrophobic porous membrane which constitutes the one side surface of the cassette and a thin plastic film which constitutes the other side surface of the cassette, the membrane being arranged at a distance from the plastic film so as to form an air gap between the membrane and said film. Warm salt water flows into one of the first cassettes from the side of the membrane remote from the air gap, while cold water flows into one of the other cassettes from the side of the plastic film remote from said air gap.

During a distillation process the warm salt water gives off water vapour, or steam, which passes through the pores of the membrane and through the air gap, whereafter the water vapour condenses on the cold plastic film. The pore size is such as to prevent liquid water from passing through the membrane.

A problem of long standing with an arrangement constructed in accordance with the aforesaid Patent Specification is one of achieving a high capacity. The high quantities of energy consumed also constitute a problem.

The present invention relates to an embodiment of a distillation apparatus of the kind described in the aforesaid Patent Specification, with which, in accordance with the invention, a high capacity can be achieved in relation to the available membrane surface, with relatively low energy consumption.

Accordingly, the present invention relates to a distillation apparatus intended for distilling liquid, primarily water, comprising a distillation unit which includes a porous hydrophobic membrane which is permeable to steam or vapour but impermeable to liquid, and further includes a condensation surface spaced from the membrane, and in which apparatus an air gap is located between the membrane and the condensation surface, said distillation apparatus further including units for conducting liquid to be distilled on the membrane surface remote from the air gap, and a unit arranged to conduct liquid, which is colder than the first mentioned liquid, on the side of the condensation surface remote from the air gap, the apparatus being characterized in that the distance between the membrane and the condensation surface lies in the range of about 0.2 mm to about 1 mm; and in that the thickness of the membrane is smaller than about 0.5 mm.

An embodiment of the invention will now be described in more detail with reference to the accompanying drawings and also with reference to a number of graphs, where FIG. 1 is a schematic vertical cross-sectional view of a separation cassette;

Figure 1:
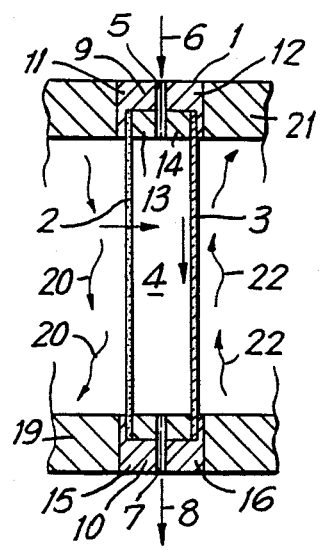

FIG. 1 is a schematic cross-sectional view of a distillation unit 1 incorporating a porous hydrophobic membrane 2 through which steam or vapour can pass, but which prevents the passage of liquid, and further incorporates a condensation surface formed by a plastic film 3 located at a distance from the membrane. Arranged between the membrane 2 and the plastic film 3 is an air gap 4, which is provided with a channel 5 or the like for supplying the air required as illustrated by the arrow 6. Located at the lower end of the air gap 4 is a channel 7 or the like for conducting away fresh water condensed in the air gap, as illustrated by the arrow 8. The membrane 2 and the plastic film 3 may be mounted in any suitable frame structure 9, 10, for example with the aid of clamping jaws 11–18.

Located on one side of the unit 1 is a unit 19 for conducting the liquid to be distilled, as illustrated by the arrows 20, so that the liquid covers the side of the membrane remote from the air gap.

Located on the other side of the unit 1, is a unit 21 for conducting liquid which is colder than the liquid to be distilled, as illustrated by the arrows 22, so that said liquid covers the side of the plastic film remote from the air gap.

The aforedescribed construction is known from the aforesaid Swedish Patent Specification. However, it is not necessary, nor yet desirable in certain cases, to arrange such units separately, or in series, where the membrane 2 and the plastic film are substantially planar surfaces. Instead, the membrane and the plastic film may be tubular and arranged concentrically in relation with one another. Similar modifications are also conceivable. For example, all suitable membrane and plastic film configurations in which the membrane and plastic film are separated by an air gap can be applied in accordance with the present invention.

Although the described arrangement and the concept of the present invention can be applied effectively with many types of liquid, the invention is primarily intended for the distillation of salt water so as to obtain fresh water therefrom, and hence the invention is described hereinafter with reference to salt water.

Figure 2:
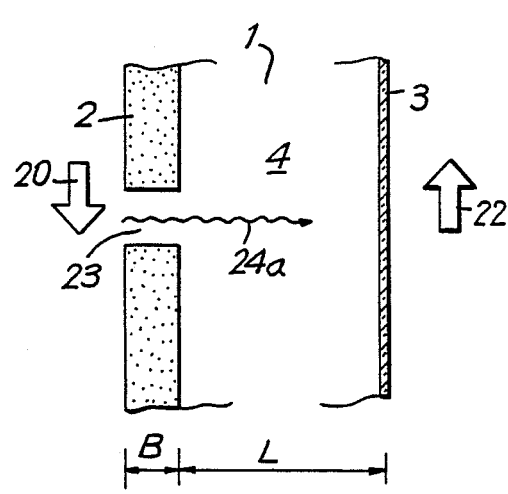
FIG. 2 is an enlarged schematic view of a membrane and a plastic film.

FIG. 2 is an enlarged view of solely the central part of the unit illustrated in FIG. 1. The membrane 2 is a hydrophobic, porous membrane made of some suitable material, such as TEFLON (registered Trade Mark). A number of such membranes are commercially available. FIG. 2 illustrates an idealized pore at 23.

In operation, heated salt water 20 flows adjacent the membrane 2 and the water vapour given off diffuses through the pores 23, as illustrated by the arrow 24a, while the liquid salt water is prevented from passing through the membrane due to the surface tension. The water vapour, or steam, diffusing through the pores is transported across the air gap and condensed on the plastic film 3, this film being cooled by the flow of colder water 22. The water condensate, the fresh water, is collected and conducted away through the channel 7.

The present invention is based on the concept that both the capacity of the apparatus and the energy required to distill the salt water depends greatly on geometric parameters of the distillation unit 1. The distillation unit 1 corresponds to the separation cassette mentioned in the introduction. In this regard, those parameters of primary significance are the thickness b of the membrane 2 and the distance L between the membrane 2 and the plastic film 3.

According to the present invention the distance L between the membrane and the plastic film is from about 0.2 to about 1 mm, and the thickness of the membrane is smaller than about 0.5 mm. When the distance L lies within the aforesaid range and there is used, at the same time, a membrane having a thickness of less than 0.5 mm, it has been found that production capacity is much higher and that the energy losses are substantially lower in comparison with those experienced with a membrane of greater thickness, such as for example a thickness of 2-3 mm and/or the distance L is either greater than 1 mm, e.g. 2 mm, or is less than 0.2 mm, e.g. 0.05 mm.

Thus, it has been discovered that the distance L has an upper limit beneath which the production capacity is markedly increased, and a lower limit beneath which the energy losses are markedly increased, and also that the distance L affects the production rate and energy losses to a particularly great extent when the membrane thickness is beneath the aforesaid value.

The aforementioned ranges afford extremely good production results and also lower the energy costs, due to the low energy losses. The energy losses referred to here are those caused by heat transfer through the membrane, these losses being mentioned in more detail hereinafter.

Figure 3:
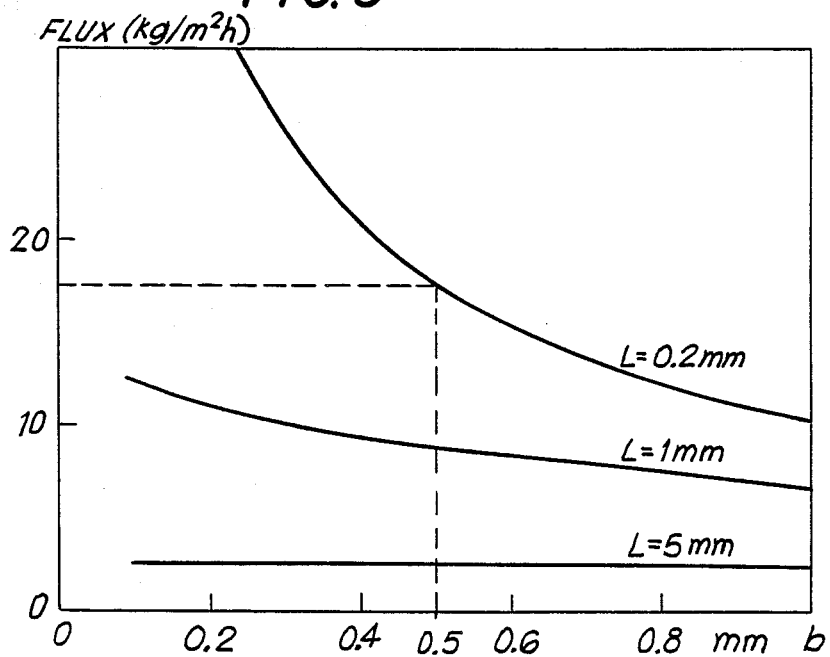
FIGS. 3-7 are various graphs constructed in accordance with an arithmetic model hereinafter described.

FIG. 3 is a graph, in which the production capacity or mass flow (FLUX) is plotted against the thickness b, and where the distance L is a parameter. The graph is valid for a salt water temperature ($T_h$) of 60° C. and a cold water temperature ($T_c$) of 20 C., and with a relative membrane pore area of $\phi = 0.8$, and a coefficient thermal conductivity for the membrane of $K_M = 0.22$ W/m²·°K.

It will be seen from the graph that the production capacity or flux increases substantially when the distance L decreases and the thickness b also decreases.

Figure 6:
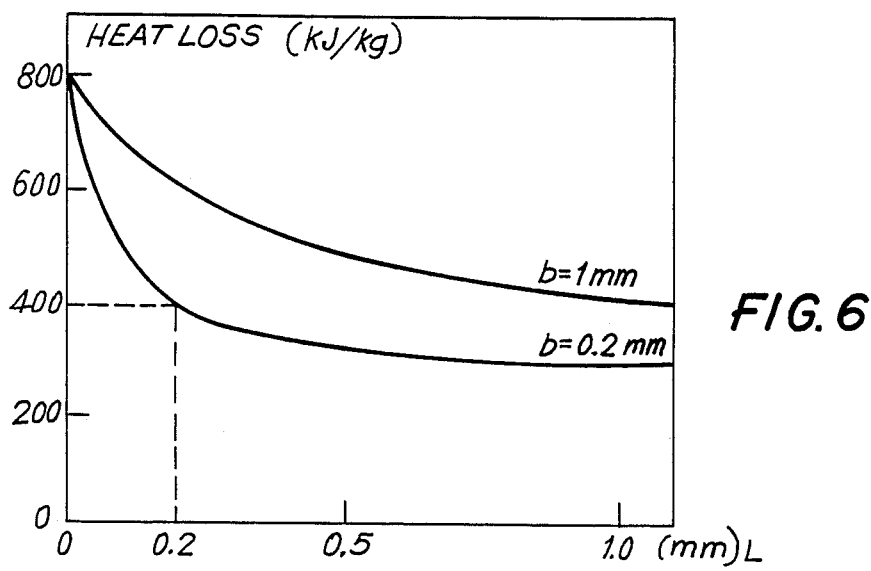

FIG. 6 is a graph in which the magnitudes $T_h$, $T_c$, $\phi$ and $K_M$ have the aforementioned values. This graph relates to heat losses caused by thermal conduction through the membrane per kilogram of distilled salt water as a function of the distance L with the thickness b as a parameter. It will also be seen from this graph that the thermal losses increase with decreasing distances L.

The aforesaid concept has resulted in a theoretical model, which can be written in the form of the following two equations, namely $$N = 6.3 \cdot 10^{-5} \cdot \frac{1}{(b/\phi \sqrt{T_h} + L/\sqrt{T_c})} \cdot \ln\left(\frac{1-x_c}{1-x_h}\right) \quad (1)$$

$$E = \frac{1.5 \cdot 10^{-3} \cdot (T_h - T_c)}{(b/(\gamma \cdot \phi \sqrt{T_h}) + L/\sqrt{T_c})} \cdot \quad (2a)$$

$$\left(1 + 1.41\left(n\frac{1-x_c}{1-x_h} \cdot \frac{b/(\gamma \cdot \phi \sqrt{T_h})}{(b/\phi \sqrt{T_h}) + L/\sqrt{T_c}}\right)\right)$$

where $$\gamma = (k_{1-2}/(\phi \cdot k_{air})) \text{ at } T_h \quad (2b)$$

where $$k_{1-2} = k_{air}\phi + k_{PTFE}(1-\phi) \quad (2c)$$

where $$k_{air} = 1.5 \cdot 10^{-3} 1 \quad (2d)$$

in which equations the following notations are used, namely, b = membrane thickness (m)
c = molar concentration (mol/m³)
$C_p$ = thermal capacity (j/mol·°K.)
D = diffusion coefficient for a mixture of steam and air (M²/s)
E = energy flow through the membrane (J/m²·S)
$K_{air}$ = thermal conductivity of air (W/m²·°K.)
$K_M$ = thermal conductivity of the membrane (W/m²·°K.)
L = the distance between the membrane and the plastic film (m)
N = molar flow through the membrane (mol/m²)
Q = flux through the membrane (kg/m²·h)
$T_c$ = the cold liquid temperature (°K.)
$T_h$ = the warm liquid temperature (°K.)
$X_c$ = molar fraction steam at the plastic film
$X_h$ = molar fraction steam at the membrane
$\phi$ = relative pore area in the membrane.

By substituting the molar flow N with the mass flow or flux Q in the equation (1) above there is obtained the mass flow.

$$Q = 4.1 \cdot 10^{-3} \frac{1}{(b/\phi \sqrt{T_h}) + L/\sqrt{T_c}} \cdot \ln\frac{1-x_c}{1-x_h} \quad (3)$$

The thermal losses (E) and production capacity (Q) can be calculated with the aid of the aforesaid formulii as a function of the distance L, the thickness b, the relative pore area of the membrane, the temperature of the warm liquid and the cold liquid respectively, etc. The graphs of FIGS. 3, 4, 5, 6 and 7 are calculated in accordance with the aforesaid model, this model being partially verified experimentally.

The length of the diffusion path is a significant factor. This length comprises the membrane thickness b and the distance L. The degree of vapourization increases when the length of the diffusion path decreases, as illustrated by FIG. 3 and FIG. 5.

Figure 5:
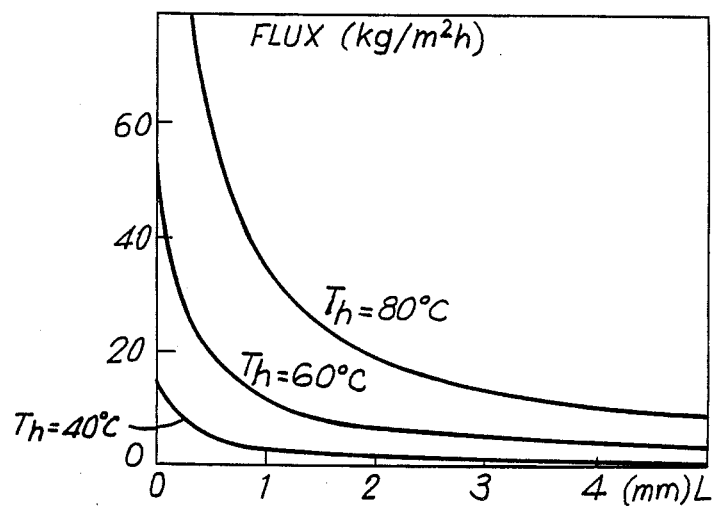

In FIG. 5 the value of the magnitude $T_h$, $T_c$, $\phi$ and $K_M$ is the same as that given for FIG. 3. In FIG. 3 the membrane has a thickness b equal to 0.2 mm.

The equation (3) above contains two dominant terms, namely one term concerning the membrane $b/(\phi\sqrt{T_h})$ and one term concerning the air gap $L\sqrt{T_c}$.

It will be seen from this that a change in the smallest term will not affect the flux, or mass flow, if the second term is very large. Therefore, the membrane thickness b will not appreciably affect the mass flow, provided that the distance L is large, as is evident from FIG. 3, vide the curve L=5 mm.

With regard to the membrane thickness b, it will be seen from FIG. 3 that there is a marked increase in mass flow when the membrane thickness b is smaller than about 0.5 mm at the same time as the distance L is smaler than 1 mm.

As beforementioned, a comparison between FIGS. 3 and 6 shows that a shorter distance L results in an increase in production capacity but that the heat losses will also increase. Since the heat losses are significant it is essential that they are kept low, in view of the cost of membrane-distilling salt water and, in certain cases, in view of the difficulties of supplying requisite thermal energy to the distillation apparatus.

The thermal energy requirement namely constitutes a large part of the costs of operating a membrane distillation plant. Thermal energy must be supplied for vapourizing the salt water and also for compensating heat losses. It is essential that attempts are made to reduce heat losses caused by thermal conduction through the membrane, partly because this thermal energy does not contribute in vapourizing the salt water, and partly because the temperature difference across the membrane decreases, causing in turn a decrease in the degree of vapourization, i.e. a decrease in mass flow, or flux, through the membrane.

FIG. 6 illustrates the heat losses through the membrane as a function of the distance L, with the membrane thickness b as a parameter. The values of the parameters $T_h$, $T_c$, $\phi$ and $K_M$ are the same as those given for FIG. 3. It will be seen from FIG. 6 that the heat losses increase with decreasing distances of L.

It was surprising to find that the heat losses decreased when using a thinner membrane, this decrease being illustrated in FIG. 6. This is due to the fact, however, that the mass flow or flux is substantially increased when using a thinner membrane, as previously mentioned in conjunction with FIG. 3.

It will also be seen from FIG. 6 that the loss of heat through the membrane increases markedly when the distance L is less than about 0.2 mm.

Figure 7:
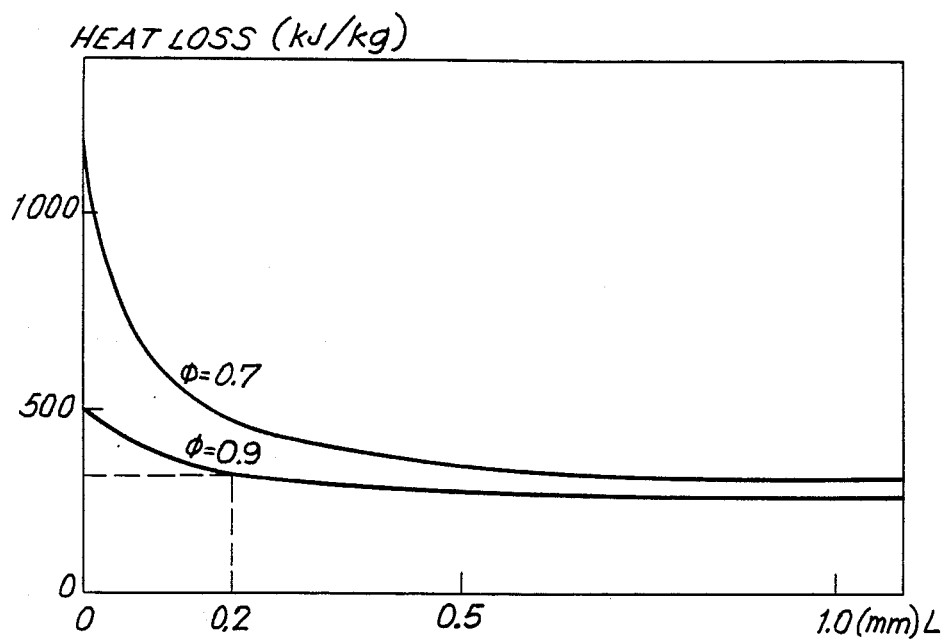

FIG. 7 illustrates the dependency of the heat losses on the distance L in respect of two mutually different membranes having a respective relative pore area $\phi$ of 0.7 and 0.9. It will also be seen from FIG. 7 that the increase in heat losses is significant when the distance L is less than about 0.2 mm for both membranes.

Because of the high increase in heat losses when the distance L is less than about 0.2 mm, the distance shall, for this reason, be greater than 0.2 mm.

Another reason for ensuring that the distance is not made smaller than that aforesaid is because water bridges are otherwise liable to form between the membrane and the plastic film. When water bridges of this nature form, the heat losses are greatly increased due to the fact that water has a higher thermal conductivity than air. In addition, the mass flow through the membrane decreases therewith, while the risk of the membrane pores becoming filled with water increases. In this event, no distillation takes place, and salt is carried with the water into the distillate.

Membranes which present highly varying relative pore areas $\phi$, namely from 0–0.96, are at present available commercially, i.e. membranes in which up to 96% of the membrane is comprised of pores. The average pore diameter of such membranes may be from 0.02–15 $\mu$m.

The magnitudes $T_h$, $T_c$, $\phi$ and $K_M$ in FIG. 7 have the same values as those given for FIG. 3. The membrane thickness is 0.2 mm.

Figure 4:
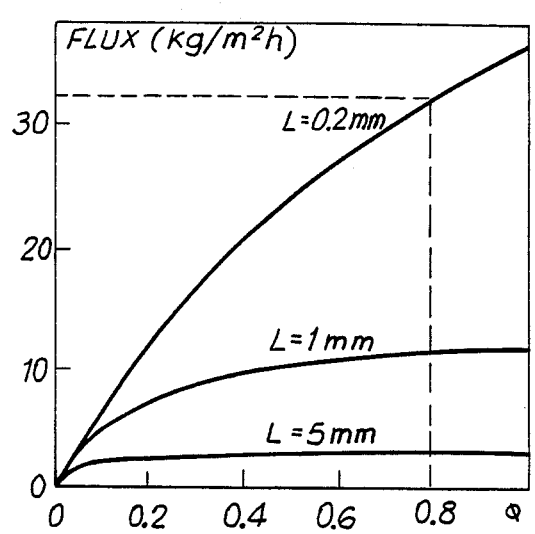

FIG. 4 is a graph showing the mass flow, or flux, as a function of the relative pore area $\phi$. The magnitudes $T_h$, $T_c$ and $K_M$ in FIG. 4 have the same values as those given for FIG. 3. The membrane thickness is 0.2 mm.

As will be seen from FIG. 4 the flux increases greatly when the relative porosity $\phi$ increases, particularly when the distance L is less than about 1 mm. The reason why the heat losses are lower in the case of a membrane having a larger relative pore area, vide FIG. 7, is due to the increased flux obtained when the porosity is greater.

According to one preferred embodiment the aforesaid membrane has a relative pore area $\phi$ exceeding 0.7, and preferably exceeding 0.8. Such a pore area further amplifies the afore related relationships between flux, i.e. production capacity, heat losses, the distance L and the membrane thickness b, as can be seen from the aforegoing and from FIGS. 4 and 7.

FIG. 5 is a graph showing the flux as a function of the distance L, with the salt water temperature $T_h$ as a parameter. The magnitudes $T_c$, $\phi$ and $K_M$ have the values given in connection with FIG. 3, and the membrane thickness is 0.2 mm.

It will be seen from FIG. 5 that a marked increase in flux takes place when the distance L is less than about 1 mm, this increase being greater for a salt water of higher temperature.

As beforementioned, a high relative pore area is preferred. The mechanical strength of the membrane, however, is lowered with increasing pore area. This constitutes a problem, particularly in combination with the fact that a narrow air gap shall be maintained. Consequently, in accordance with one preferred embodiment, vide (please see) FIGS. 8 and 9, the membrane 2 is provided with a carrier, such as fibres 24, for example plastic fibres, laid in the membrane, these fibres being randomly oriented or laid on the membrane in an ordered array, and having a diameter corresponding to the desired distance L. The surface of the membrane provided with a carrier is turned towards the aforesaid condensation surface.

Figure 8:
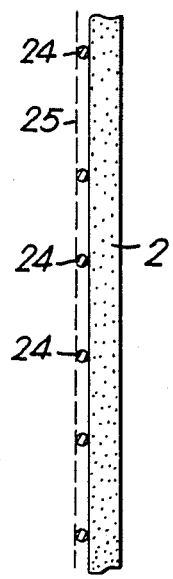
FIG. 8 is a part sectional view of a membrane provided with a carrier.
Figure 9:
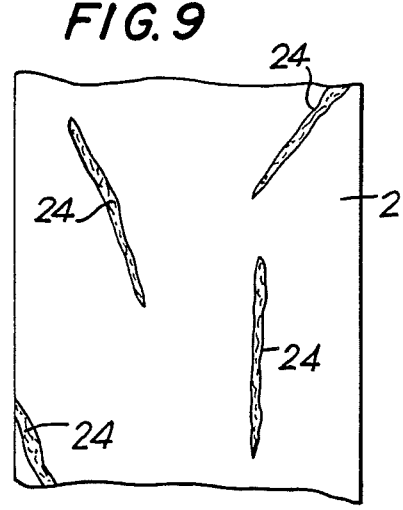
FIG. 9 is a partial plan view of a membrane seen from the left in FIG. 8.

Instead of fibres 24, a net or some other supporting element can be attached to the membrane, the thickness of the carrier in a direction perpendicular to the surface of the membrane corresponding to the desired distance L. Such modifications are considered to be included in the invention. Such an embodiment provides a strong membrane even when the relative pore area is high, with the fibres or carrier simultaneously forming spacing elements for maintaining the aforesaid air gap. The condensation surface is indicated in FIG. 8 by a broken line 25.

It will therefore readily be understood that the present invention teaches a method of obtaining high production and low heat losses, and therefore represents an important step forward in the field of membrane distillation technology.

I claim:
1. Apparatus for distilling a liquid, comprising:
   a porous membrane, said membrane being pervious to vapor but impervious to liquid, and having a thickness of less than about 0.5 mm;
   a condensation surface spaced a predetermined distance apart from the membrane;

an open gap between the membrane and the condensation surface, said open gap having a width of between about 0.2 mm and about 1.0 mm, said vapor diffusing only across said membrane and said open gap;

means for supplying the liquid to be distilled to the surface of said membrane remote from the open gap; and means for maintaining the temperature of the condensation surface remote from the open gap at a lower temperature than the temperature of the liquid to be distilled.

2. The distillation apparatus of claim 1, wherein said membrane has a relative pore area exceeding 0.7.

3. The distillation apparatus of claim 2, wherein said membrane has a relative pore area exceeding 0.8.

4. The distillation apparatus of claim 1, wherein said membrane further includes a vapor impervious gap-maintaining spacer interposed between said condensation surface and the membrane.

5. The distillation apparatus of claim 2, wherein said membrane further includes a vapor impervious gap-maintaining spacer interposed between said condensation surface and the membrane.

6. The distillation apparatus of claim 4, wherein said spacer comprises fibers.

7. The distillation apparatus of claim 5, wherein said spacer comprises fibers.

8. Apparatus for distilling a liquid, comprising:

a porous membrane, said membrane being pervious to vapor but impervious to liquid, and having a thickness of less than about 0.5 mm;

a condensation surface spaced a predetermined distance apart from the membrane;

an open gap between the membrane and the condensation surface, said open gap having a width of between about 0.2 mm and about 1.0 mm, said vapor diffusing only across said membrane and said open gap;

means for supplying the liquid to be distilled to the surface of said membrane remote from the open gap; and means for supplying a coolant to the side of the condensation surface remote from the open gap, said coolant being at a lower temperature than the temperature of the liquid to be distilled.

9. The appartus of claim 1, wherein said open gap communicates with a channel for supplying air into the gap.

10. The apparatus of claim 8, wherein said open gap communicates with a channel for supplying air into the gap.

* * * * *